June 3, 1947.  C. L. JOHNSON  2,421,699
AUXILIARY FUEL TANK
Filed May 12, 1944   4 Sheets-Sheet 1
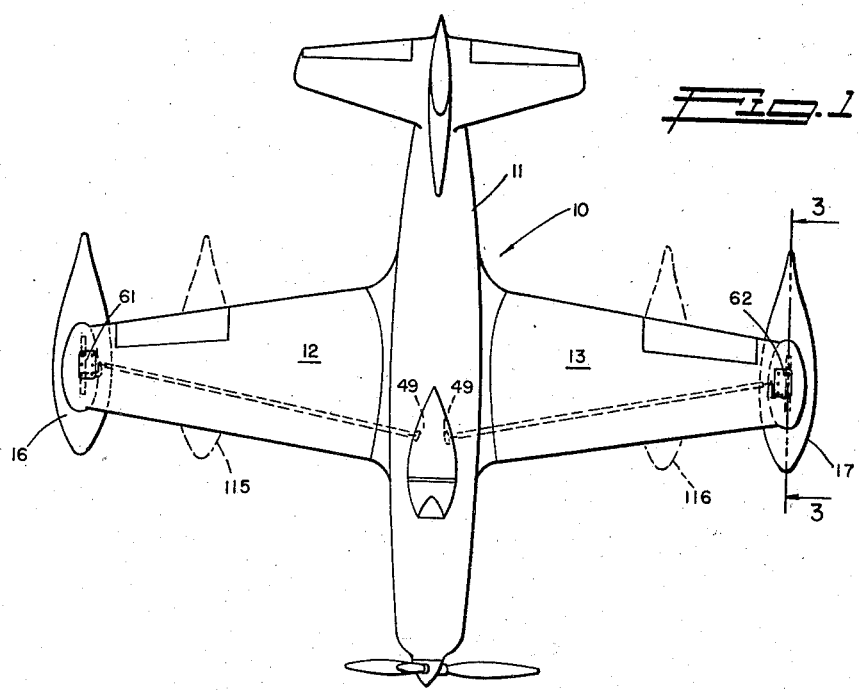
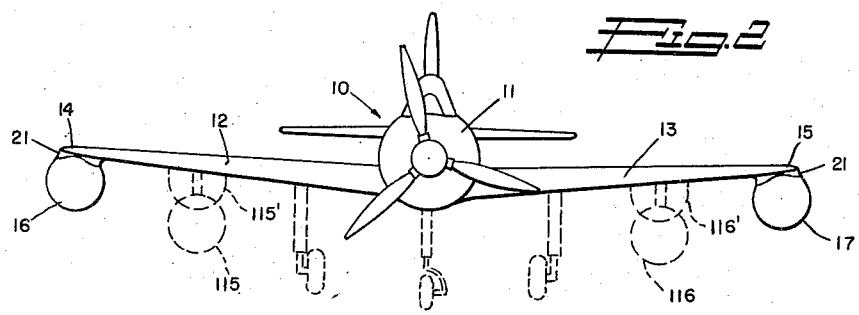
INVENTOR.
CLARENCE L. JOHNSON
BY
*George C. Sullivan*
AGENT

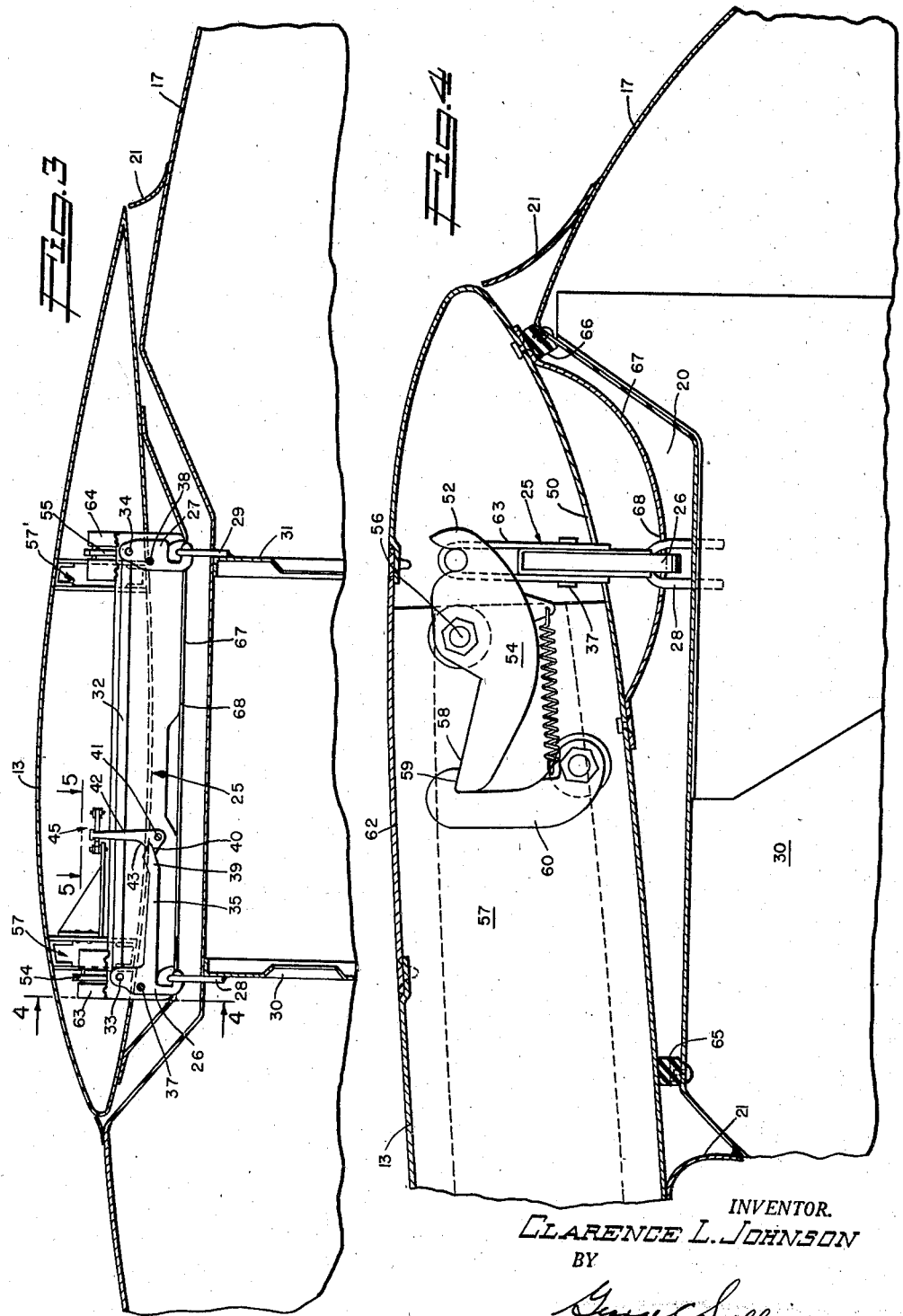

June 3, 1947.   C. L. JOHNSON   2,421,699
AUXILIARY FUEL TANK
Filed May 12, 1944   4 Sheets-Sheet 3
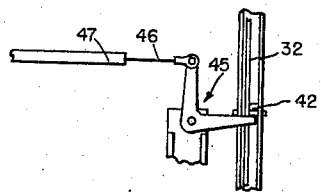
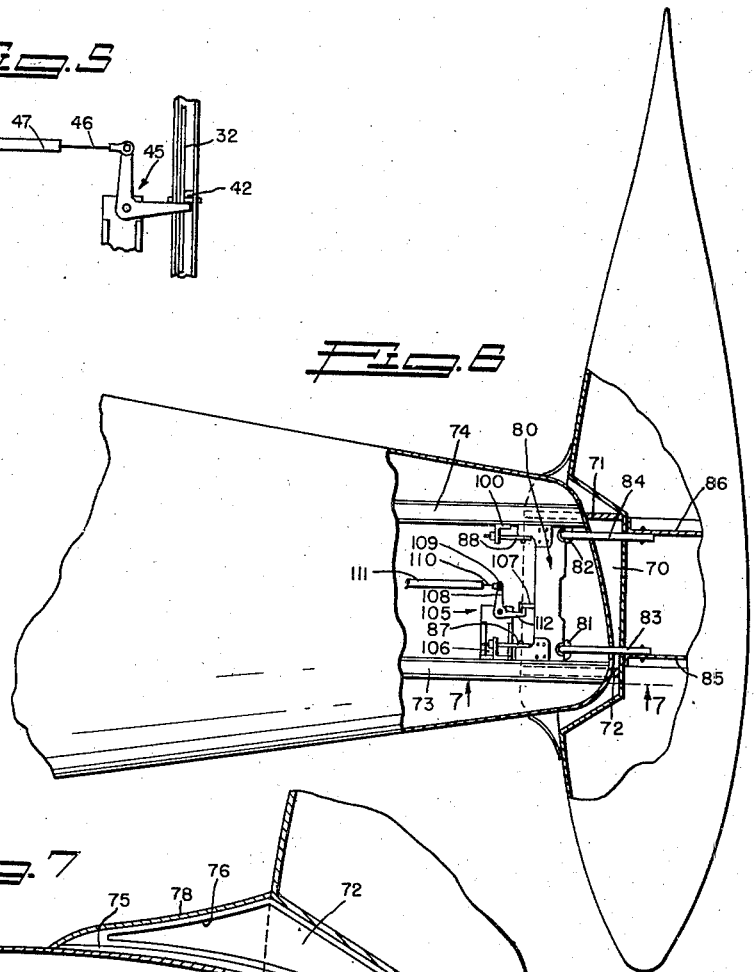
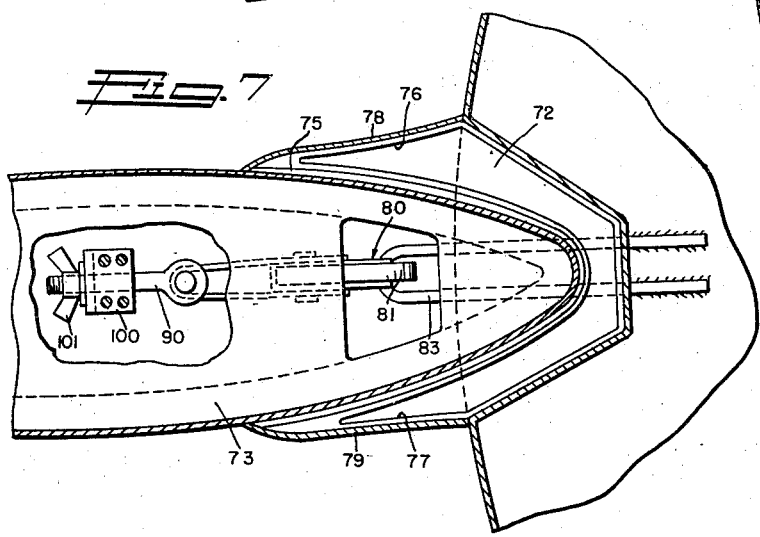
INVENTOR.
CLARENCE L. JOHNSON
BY
George C. Sullivan
AGENT

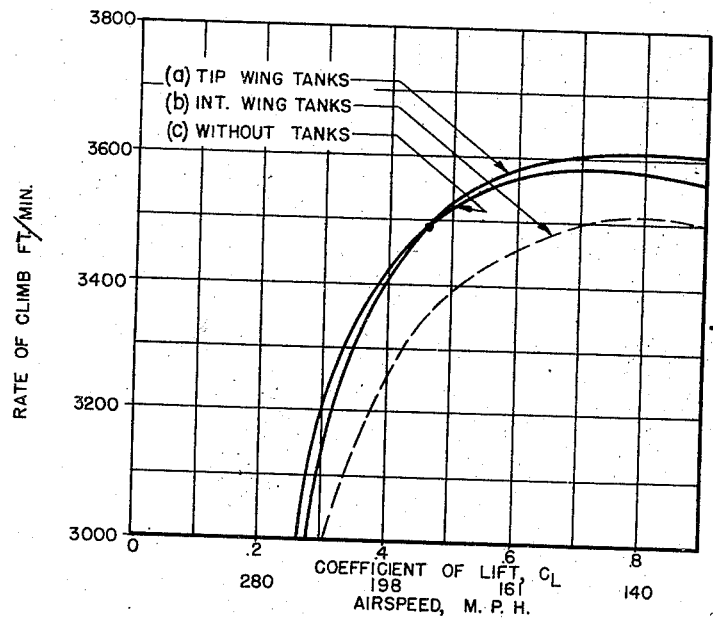
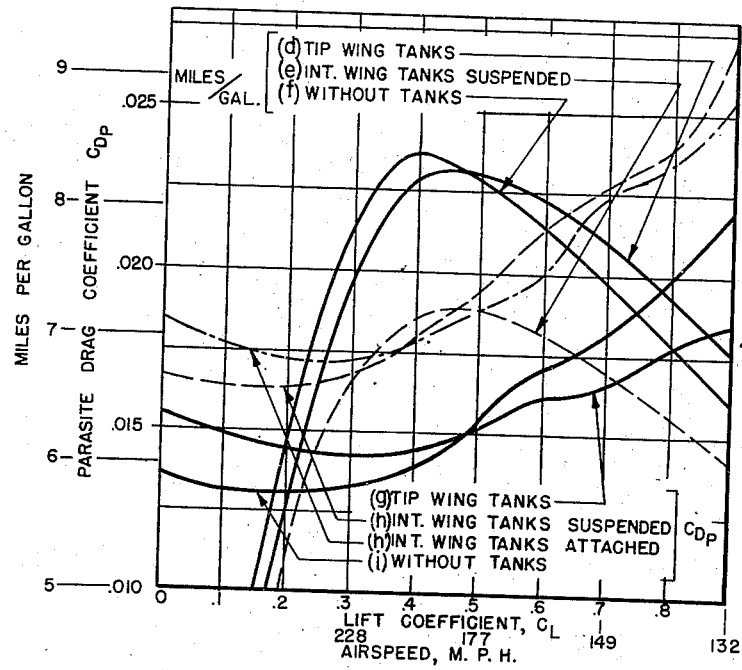

Patented June 3, 1947

2,421,699

UNITED STATES PATENT OFFICE 2,421,699

AUXILIARY FUEL TANK

Clarence L. Johnson, Encino, Calif., assignor to Lockheed Aircraft Corporation, Burbank, Calif.

Application May 12, 1944, Serial No. 535,307

7 Claims. (Cl. 244—135)

This invention relates to airplane construction in general and more particularly to an improved method and apparatus for carrying reserve fuel in an airplane.

It has heretofore been the practice to carry reserve fuel, particularly in military types of airplanes for the purpose of extending their range of operation, by employing the so-called external, droppable or jettisonable wing tanks. Such wing tanks have heretofore been constructed in streamlined form and suspended under the wing at intermediate points of the wing span.

Such arrangement, while serving to extend the operative range of the airplane has, however, resulted in an undesirable penalty in the way of increased parasite drag with its attendant reduction of speed and climb and also of fuel economy.

It has been discovered that jettisonable or droppable, external wing tanks can be advantageously carried and supported by attachment to the tips of the wings in such manner as to merge the contour of the wing tip and tank together at the point of attachment, with the effect that the resultant parasite drag is not only not increased but in some cases and under some conditions is actually decreased to a value less than that which the wing has without such external tanks. It has also been discovered that, in general, the droppable tanks can be carried at the wing tips with a marked reduction in drag over that which the same tanks cause when suspended at an intermediate portion of the wing span as has heretofore been conventional practice. Full advantage and benefit of the additional fuel which may be carried in such external, droppable or jettisonable wing tanks may thus be realized by attaching them to the wings in the manner of the present invention.

It is, accordingly, an object of this invention to provide an improved means for carrying a disposable auxiliary fuel load on an airplane.

It is a further object to provide an improved method of attachment of an external wing tank, bomb, or the like body, to the wing of an airplane.

These and other objects and features of novelty will become evident hereinafter in the description which, together with the following drawings, illustrate preferred embodiments of the invention.

Figure 1 is a plan view showing the general arrangement of the wing tip tanks on an airplane.

Figure 2 is a front elevation of the general arrangement shown in Figure 1.

Figure 3 is an enlarged fragmentary cross sectional view taken on line 3—3 of Figure 1.

Figure 4 is an enlarged fragmentary cross sectional view taken on line 4—4 of Figure 3.

Figure 5 is a detailed view of a portion of the apparatus taken on line 5—5 of Figure 3.

Figure 6 is a fragmentary plan view shown partly in section of an alternative arrangement of the apparatus of the invention.

Figure 7 is a fragmentary cross sectional view taken on line 7—7 of Figure 6.

Figure 8 is a graph, indicating the advantages in rate of climb of the airplane gained by carrying the tanks at the wing tips.

Figure 9 is a graph, indicating the advantages in economy of operation gained by carrying the tanks at the wing tips.

Referring now to the drawings in which like reference numerals refer to corresponding parts throughout the several figures, the apparatus of the invention is as follows:

With reference primarily to Figures 1 and 2, 10 is an airplane of substantially conventional design having a fuselage 11 and wings 12 and 13. At the wing tips 14 and 15 are shown fuel tanks 16 and 17 of circular cross section and streamlined profile, said tanks being supported at a point below and substantially at the wing tips. The tank is formed as best shown in Figure 4 with an upper recess 20 and surrounding farings and fillets 21, of such shape as effectively to merge the streamlined form of the tank into the end contour of the wing tip.

As best shown in the preferred structure in Figures 3 and 4, the fuel tanks 16 and 17 are each suspended from a wing tip by means of a conventional bomb shackle mechanism as shown at 25. The bomb shackle carries a pair of pivotable hooks 26 and 27, the fingers of which reach through the pair of U bolts or clevises 28 and 29 which are in turn connected by suitable means, such as by welding, to internal tank bulkheads 30 and 31. A horizontal link 32 extends between pivots 33 and 34 in the upwardly extending lever portions of the shackle hooks 26 and 27 to provide for simultaneous pivotal motion of the said hooks 26 and 27 for simultaneous insertion or withdrawal of the hook fingers from the U shaped clevises 28 and 29. The said clevises 28 and 29 rest upon the fingers of hooks 26 and 27 at points eccentrically positioned with respect to the hook pivots 37 and 38 so that the said hooks, under the turning moment of the weight of the fuel tank, tend to open by clockwise angular rotation about the pivots 37 and 38 as viewed in Figure 3. A lever 35 extending laterally from the body of the hook 26 serves to resist the opening turning moment thus imposed upon the hooks 26 and 27, by the weight of the fuel tank and thus preventing the release of the clevises from the hooks by resting at its outer end 39 against a cam surface 40 which is in turn pivotally supported at 41 in the body of the bomb shackle 25. A control lever 42 extends upward from the cam 40, and the downward force of the hook lever 35 acting eccentrically against the cam surface 40 tends to rotate the cam 40 and the lever 42 counter-clockwise into locked engagement at 43 whereby normally the shackle hooks 26 and 27 are prevented from disengaging the clevises 28 and 29. However, forceful counter-clock rotation of the lever 42 sufficient to open the locking engagement at 43 and to move the cam surface 40 out of engagement with the end 39 of the lever 35 will allow lever 35 to drop and the fingers of the hooks 26 and 27 to move out of engagement with the clevises 28 and 29, thus releasing the fuel tank from the wing tip.

Provision is made for actuating the lever 42 from suitable controls in the pilot's compartment or from other suitable control stations in the airplane. This is accomplished by means of a bell crank 45 which is actuated by means of a Bourdon cable 46 which in turn passes through a suitable Bourdon housing 47 to a movable control handle 49 in the pilot's compartment in the airplane, all as best illustrated in Figures 1 and 5.

The hereinbefore described bomb shackle 25 is positioned to extend through a suitable longitudinal slot, as shown at 50 in Figure 4, in the lower skin surface of the wing tip and, for convenience of installation, is adapted to be suspended by a pair of links 63 and 64 from a pair of hooks 52 and 53 which are in turn carried on the outer ends of pivotally supported levers 54 and 55. The said levers 54 and 55 are pivotally supported by suitable means such as by bolts or pins as shown at 56 which pass through suitable bushings in and adjacent the outer end of the wing beams 57 and 57'. Levers as shown at 58, extending rearwardly from the hooks 54 and 55, normally are locked against rotation by means of latches 59 carried on spring actuated pawls as shown at 60.

Operation of the pivotal hooks 54 and 55 are accomplished by removing the hand hole covers provided at 61 and 62 in the upper skin surface of the wing tips and manually actuating the pawls 60 to latch or unlatch the hooks 54 and 55. In the process of installing the wing tip tanks in place on the wing tips, the bomb shackle 25 is usually first attached to the wing tank by engaging the shackle hooks 26 and 27 with the tank clevises 28 and 29 and then the tank, together with the bomb shackle 25 is lifted by suitable means into proper position below the wing tip with the bomb shackle 25 extending upward through the slot 50 and the shackle frame links 63 and 64 are then engaged by the finger 52 of the shackle hooks 54 and 55.

A pair of bumper strips 65 and 66 attached to the tank skin bear against the lower surface of the wing and serve to prevent lateral sway of the tank about the shackle support under flight conditions.

A supplementary streamlining shroud member 67 is carried on the lower surface of the wing tip to cover the portion of the body of the shackle 25 which projects outward through the wing skin slot 50 into the air stream. Slots 68 and 69 are provided in the shroud 67 through which the fingers of the shackle hooks 26 and 27 and tank clevises 28 and 29 extend.

Referring now primarily to Figures 6 and 7, an alternative method of mounting the wing tanks in centered positions upon the wing tips is illustrated.

The wing tanks which are of circular cross section and of elongated streamlined shape, as hereinbefore described in connection with Figures 1, 2 and 4, are each provided with a recess 50 into which the curved end portion of the wing tip may extend. The wing tank is supported in a centered position with respect to the wing tip by means of a pair of intermediately positioned U shaped fillers or gusset members as shown at 71 and 72 in Figure 6 and at 72 in Figure 7. The gusset members are shaped with an inner contour adapted to fit the lateral curvature of the upper and lower surfaces of the wing tip along lines in the projected planes of the ends of the wing beams 73 and 74. The outer end of the gusset members 71 and 72 opposite the wing tips are angularly shaped to fit firmly into the V-shaped recess 70 in the wing tank. The before mentioned gusset members 71 and 72 are provided with thin layers of suitable padding material such as rubber or felt which are adapted to lie intermediate the inner surface contour of the gussets and the wing skin as shown at 75 to prevent scarring or damaging of the surface of the wing tip. The outer surfaces indicated at 76 and 77 of the gusset members 71 and 72 carry attached to them thin streamlining shroud or fillet members 78 and 79 which encircle the wing tip and join together at their leading and trailing edges to form a fairing or filleting member which smoothly merges the contours of the wing and the wing tank together.

The wing tank is held firmly in position and in alignment with the wing tip and against the gussets 71 and 72 by means of a conventional bomb shackle 80 acting in tension and which is constructed and operated in a manner substantially the same as that hereinbefore described in connection with Figures 3 and 4 except that it is positioned horizontally within the wing tip. The shackle hooks 81 and 82 of the bomb shackle make connection with the pair of tank clevises 83 and 84 carried by the tank which in turn are attached at their inner ends in any suitable manner such as by welding or riveting to a pair of transverse tank bulkheads as shown at 85 and 86 in Figure 6. The inner end of the bomb shackle 80 is attached to the wing beams through a pair of end shackle frame links as shown at 87 and 88 by means of a pair of eye bolts as best shown at 90 in Figure 7. The threaded shanks of the eye bolts 90 make sliding fits through holes in suitable angle plates 100 which are in turn attached to the webs of the wing beams 73 and 74. The eye bolts are provided with suitable means such as wing nuts 101 threaded on the ends thereof for tensile adjustments.

Tightening of the wing nuts 101 on the eye bolts 90 serve, by transmitting tension through the bomb shackle, to draw the wing tanks into firm engagement and position against the wing tips as determined by the intermediate gussets 71 and 72.

Release of the wing tanks from the shackles is accomplished in a similar manner to that hereinbefore described in connection with Figures 3 and 5. A bell crank 105 pivotally supported upon an angle clip 106 extending from the inner surface of the web of the wing beam 73 serves to actuate the bomb shackle release lever 107. The lever 108 of the bell crank 105 is connected at 109 with the outer end of a Bourdon cable 110 which extends inward through the wing through a Bourdon sheathing 111 to a control handle 49 located within the pilot's compartment as shown in Figure 1. Thus, in operation pulling of the control handle 49 and the resultant inward movement of the Bourdon cable 110 serves to rotate the bell crank 105 in a counter-clockwise direction as viewed in Figure 6, thereby in turn bringing the lever 112 of the bell crank into engagement with the shackle release lever 107, and the resultant rearward motion of the lever 107 actuates the release of the clevis hooks 81 and 82 to release the wing tanks in the manner hereinbefore described in connection with Figure 3.

A typical airplane of approximately 9,000 pounds gross weight having an aspect ratio of six, a wing loading of 40 lbs. per square foot, and a power plant of approximately 1,600 B. H. P. operating at a propeller efficiency of approximately 85% was fitted with a pair of 180 gallon wing fuel tanks in the manner illustrated in Figures 1 and 2. The fuel tanks were of laminar flow profile having a total length of approximately 27 percent and a diameter of approximately 6 percent of the wing span. Figures 8 and 9 illustrate the the various advantageous flight characteristics obtained with the before described arrangements of wing tip fuel tanks in conjunction with the before mentioned airplane.

In Figure 8 in which the rate of climb of the airplane is plotted as the ordinate against the coefficient of lift and corresponding air speed in miles per hour as abscissa, curve $a$ illustrates the relationship between the rate of climb and the coefficient of lift at which the airplane is operating for the case where the auxiliary fuel tanks are carried at the tips of the wings as illustrated at 16 and 17 in Figures 1 and 2.

Curve $b$ illustrates the relationship between the rate of climb and the operating coefficient of lift for the airplane when equipped with auxiliary fuel tanks suspended from an intermediate portion of the wing span as illustrated by dotted lines at 105 and 106 in Figures 1 and 2.

Curve $c$ illustrates the relationship between the rate of climb and the coefficient of lift of the airplane without either the intermediate or wing tip fuel tanks.

In Figure 9, in which the economy of the airplane in miles per gallon and the parasite drag coefficients are plotted as ordinates against the coefficients of lift and air speed in miles per hour as abscissa are graphically illustrated, curve $d$ indicates the relationship between the miles per gallon and operating coefficient of lift or air speed for the condition where the auxiliary fuel tanks are supported at the wing tips as shown in Figures 1 and 2. Curve $e$ illustrates the relationship between the miles per gallon and the operating coefficients of lift or air speeds for the condition where the auxiliary fuel tanks are suspended at intermediate points in the wing span as illustrated in dotted lines at 105 and 106 in Figures 1 and 2. Curve $f$ illustrates the relationship between the miles per gallon and the operative lift coefficient or air speed for the condition where the wings are free of all auxiliary wing tanks.

Curve $g$ illustrates the relationship between the parasite drag and the operating coefficients of lift for the condition where the auxiliary fuel tanks are supported at the wing tips as illustrated at 16 and 17 in Figures 1 and 2. Curves $h$ and $h'$ illustrate respectively the relationship between the parasite drag and the operating coefficients of lift for the conditions where the auxiliary fuel tanks are suspended at intermediate positions in the wing span as illustrated at 115 and 116, and attached at intermediate positions in the wing span as illustrated in dotted lines at 115' and 116' in Figure 2. Curve $i$ illustrates the relationship between the parasite drag and the operating coefficients of lift for the condition where the airplane is free of all auxiliary fuel tanks.

It is evident from curves $d$ and $f$ in Figure 9 that the carrying of the auxiliary fuel tanks at the wing tips results in only slight increase in the fuel consumption at high operating air speeds and that at air speeds below approximately 200 miles per hour which corresponds to operating coefficients of lift less than approximately .46, the operating economy of the airplane in terms of gasoline consumption is actually greater under the conditions where the auxiliary fuel tanks are supported at the wing tips than it is in the absence of all auxiliary fuel tanks. At relatively low cruising speeds such as those which may have to be maintained in escorting operations it may be the best procedure to allow the wing tip tanks to remain attached even after they have been emptied of fuel, instead of releasing them as is the usual practice. The relationships between curves $d$ and $e$ show the marked superiority in economy effected by carrying the auxiliary fuel tanks at the wing tips as contrasted with carrying them at intermediate points in the wing span.

Curves $g$ and $i$ show that the parasite drag of the airplane at high speeds is only slightly better in the absence of the wing tip tanks and that at operating coefficient of lift above .46 which corresponds to air speeds below approximately 200 miles per hour the parasite drag of the airplane is actually lower when carrying the auxiliary fuel tanks at the wing tips as contrasted with the complete absence of any auxiliary fuel tanks.

Curves $h$ and $h'$ show the relatively high parasite drag of the airplane with the wing tanks suspended or attached at the intermediate position of the wing span as shown in dotted lines at 115, 116 and 115', 116' in Figure 2 as contrasted with the relatively low parasite drag with the tanks installed at the wing tips as shown at 16 and 17 in Figure 2.

The graphical illustrations hereinbefore discussed in connection with Figures 8 and 9 illustrate the unforeseen advantages in performance and economy which may be attained by means of auxiliary fuel tanks when carried at the wing tips.

In the arrangement where the auxiliary fuel tanks are attached and carried in a position centered upon the wing tip as shown in Figures 6 and 7, slightly improved performance characteristics are attained over that for the dependent position of the wing tip tanks as illustrated in Figures 1 and 2, and thus, from an aerodynamic standpoint, the arrangements of Figures 6 and 7 are preferred. However, this centered tank position entails a number of structural problems which are more difficult to solve than those involved in connection with the dependent arrangement illustrated in Figures 1 and 2. Thus, while the constructions of Figures 6 and 7 are, as before stated, the preferred ones from an aerodynamic consideration, the construction of Figures 1 and 2 are the preferred ones insofar as the mechanical and structural considerations are concerned.

For convenience the present invention has been illustrated and described hereinbefore as a means and method for more efficiently carrying auxiliary, jettisonable, or droppable wing tanks to be employed to carry supplementary fuel for the purpose of extending the operating range of an airplane. This invention however is to be understood as not limited to the carrying of fuel tanks but is to be understood to be equally applicable to the carrying of any other substance or body which may be formed or contained in similar containers or shapes such as, for example, a bomb.

Insofar as the broad aspects of the invention are concerned the tanks may be permanently or detachably supported from or on the wings and they may be either centered with or dependent from the wing tips. The tanks also need not be exactly cylindrical in cross section as herein illustrated, but may be elliptical, or even rectangular in section, so long as they are properly streamlined with respect to their longitudinal axis and are also reasonably well faired into the wing tip surface contour.

It is to be understood therefore, that the foregoing is not to be limited but may include any and all forms of methods and apparatus which are included within the scope of the claims.

I claim:

1. In combination in an airplane, a wing, and separate jettisonable external containers of streamlined form having a maximum section of substantially greater thickness than and positioned in substantial parallelism with the maximum thickness of the tips of the wing, said external containers being positioned adjacent the wing tips and having their axes disposed substantially parallel to the normal line of flight of said airplane, quick detachable means for releasing said containers from the airplane while in flight, and means associated with said wing tips and containers adapted to merge with the containers whereby to house the quick detachable means and to provide fairings conducive to streamlined airflow around the point of attachment between the container and the wing tip.

2. In combination in an airplane, a wing, and a separate jettisonable external tank of streamlined form having a maximum diameter substantially greater than the thickness of the wing adjacent thereto, said tank being supported in substantial axial parallelism with the line of flight of the airplane and adjoinment with the tip of said wing, the surface contour of said wing tip and said tank being in substantial mergence.

3. In combination in an airplane, a wing, and a separate jettisonable external tank of elongated streamlined form supported in substantial axial parallelism with the chord and adjoinment with the tip of said wing, the surface contour of said wing tip and said tank being faired into substantial mergence and quick detachable means actuable from a control station in said airplane for releasing said tank from said wing tip while in flight.

4. Apparatus in accordance with claim 2 in which the tank is supported in substantially centered position with respect to the chord plane of the wing tip.

5. Apparatus in accordance with claim 2 in which the tank is supported in a substantially dependent position with respect to and adjacent to the wing tip.

6. Apparatus in accordance with claim 3 in which the tank is supported in substantially centered position with respect to the chord plane of the wing tip.

7. Apparatus in accordance with claim 3 in which the tank is supported in a substantially dependent position with respect to and adjacent to the wing tip.

CLARENCE L. JOHNSON.

REFERENCES CITED

The following references are of record in the file of this patent:

UNITED STATES PATENTS

| Number | Name | Date |
| --- | --- | --- |
| 1,996,281 | Dolan | Apr. 2, 1935 |
| 1,685,458 | Lidback | Sept. 25, 1928 |
| 2,105,307 | Akerman | Jan. 11, 1938 |
| 1,865,749 | Fleet | July 5, 1932 |
| 2,074,201 | Bechereau | Mar. 16, 1937 |
| 2,375,423 | Lobelle | May 8, 1945 |
| 2,375,858 | Makaroff | June 20, 1942 |